(12) United States Patent
Mansouri et al.

(10) Patent No.: US 12,545,409 B2
(45) Date of Patent: Feb. 10, 2026

(54) SEAT PARTITIONING SYSTEMS

(71) Applicants: Safran Seats USA LLC, Gainesville, TX (US); Safran Seats, Plaisir (FR)

(72) Inventors: Reza Mansouri, Santa Fe Springs, CA (US); Arthur Glain, Boulogne-Billancourt (FR)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 0 days.

(21) Appl. No.: 18/021,777

(22) PCT Filed: Aug. 31, 2020

(86) PCT No.: PCT/US2020/048759
§ 371 (c)(1),
(2) Date: Feb. 16, 2023

(87) PCT Pub. No.: WO2022/046107
PCT Pub. Date: Mar. 3, 2022

(65) Prior Publication Data
US 2023/0348063 A1    Nov. 2, 2023

(51) Int. Cl.
*B64D 11/00* (2006.01)

(52) U.S. Cl.
CPC .................. *B64D 11/0023* (2013.01)

(58) Field of Classification Search
CPC .... B64D 11/0023; A47H 23/00; A47H 23/08; A47H 2023/025; A47H 1/04; A47H 2001/047; A47H 2201/00; A47H 2201/01; A47H 2201/02; B60R 21/026; B60R 13/0823
See application file for complete search history.

(56) References Cited

U.S. PATENT DOCUMENTS

| | | | |
|---|---|---|---|
| 2,134,032 A | | 10/1938 | Crawford et al. |
| 5,816,534 A | * | 10/1998 | Schumacher ...... B64D 11/0023 244/119 |
| 10,737,788 B2 | * | 8/2020 | Slyter ...................... A47H 1/18 |
| 11,034,429 B2 | * | 6/2021 | Tubbs ................ B64D 11/0015 |
| 2003/0127562 A1 | | 7/2003 | Pereira et al. |

(Continued)

FOREIGN PATENT DOCUMENTS

| | | | |
|---|---|---|---|
| DE | 4119623 C1 | * | 10/1992 |
| DE | 102010050108 B3 | * | 4/2012 ......... B64D 11/0023 |

(Continued)

OTHER PUBLICATIONS

International Patent Application No. PCT/US2020/048759, International Search Report and Written Opinion, dated Apr. 26, 2021.

*Primary Examiner* — Joshua J Michener
*Assistant Examiner* — Ryan Andrew Yankey
(74) *Attorney, Agent, or Firm* — Kilpatrick Townsend & Stockton LLP

(57) ABSTRACT

Described are passenger partitioning systems having multiple divider partitions arranged. A first divider partition is arranged along an longitudinal axis of an passenger aircraft. A second divider partition is arranged along a lateral axis of the aircraft. The passenger partition systems may be used to partition off two or more seats within the passenger aircraft (e.g., to quarantine sick passengers).

14 Claims, 6 Drawing Sheets

(56) References Cited

U.S. PATENT DOCUMENTS

| | | | | |
|---|---|---|---|---|
| 2007/0018044 A1* | 1/2007 | Bock | ................... | B64D 11/0023 |
| | | | | 244/118.5 |
| 2011/0062283 A1* | 3/2011 | Breuer | ................... | B64D 11/00 |
| | | | | 244/118.5 |
| 2012/0043028 A1* | 2/2012 | Roach | ................ | B64D 11/0023 |
| | | | | 160/84.01 |
| 2014/0158310 A1* | 6/2014 | Slyter | ................ | B64D 11/0023 |
| | | | | 160/124 |
| 2015/0210393 A1* | 7/2015 | Savian | ............... | B64D 11/0601 |
| | | | | 244/118.6 |
| 2017/0009504 A1* | 1/2017 | Colacecchi | ............... | A47H 1/04 |
| 2018/0208316 A1* | 7/2018 | Lange | ................... | B64D 11/02 |
| 2018/0265201 A1* | 9/2018 | Carlioz | ............. | B64D 11/0601 |
| 2023/0348063 A1* | 11/2023 | Mansouri | ........... | B64D 11/0023 |

FOREIGN PATENT DOCUMENTS

| | | | | |
|---|---|---|---|---|
| EP | 2990334 A1 * | 3/2016 | ......... | B64D 11/0023 |
| WO | 2019224591 A1 | 11/2019 | | |

\* cited by examiner

SEAT PARTITIONING SYSTEMS

FIELD OF THE INVENTION

The field of the disclosure relates to partitions within passenger aircrafts. In particular, partitions extending in multiple axes are described.

BACKGROUND

Interior layouts of commercial aircrafts have typically been designed to maximize space. This is especially true in economy seating. Thus, the numbers of seats installed length-wise (e.g., number of rows) and across the aircraft (e.g., number of seats in each row) often results in passengers coming into close contact with each other.

SUMMARY

Examples of the invention covered by this patent are defined by the claims below, not this summary. This summary is a high-level overview of various aspects of the invention, and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a passenger accommodation system, including a passenger seating deck disposed within a fuselage of an aircraft, is provided. The passenger seating deck may be defined by a floor and a ceiling, the fuselage having a longitudinal axis extending in the direction of travel of the aircraft and a lateral axis extending transverse to the longitudinal axis. The passenger accommodation system also includes a plurality of passenger seats disposed within the passenger seating deck. The passenger accommodation system also includes a seat partitioning system located within the passenger seating deck and a plurality of divider partitions. The passenger accommodation system also includes where a first divider partition of the plurality of divider partitions is moveably connected to the ceiling, substantially aligned with the longitudinal axis, and formed from a flexible material. The passenger accommodation system also includes where a second divider partition of the plurality of divider partitions is connected to the ceiling, substantially aligned with the lateral axis, and formed from a rigid material. The passenger accommodation system also includes where the second divider partition is moveable with respect to the first divider partition to selectively isolate at least one passenger seat from other adjacent passenger seats of the plurality of passenger seats.

In some examples, the plurality of passenger seats may be arranged in a set of rows and a set of columns, at least some columns of the set of columns aligned with the longitudinal axis and at least some rows of the set of rows aligned with the lateral axis. In some examples, the first divider partition and the second divider partition may be configured to isolate at least one of two or more rows of passenger seats or two or more columns of passenger seats.

In some examples, the plurality of divider partitions may be removably connected to the ceiling via a connecting mechanism. In some examples, the connecting mechanism includes curtain tracks, snaps, or hook and loop fasteners. In some examples, the passenger accommodation system may further include an overhead storage system including a plurality of storage bins, the overhead storage system fixedly mounted to the ceiling above the plurality of passenger seats. In some examples, at least the second divider partition may be connected to the overhead storage system. In some examples, the plurality of divider partitions may be configured to provide unobstructed access to the plurality of storage bins. The passenger accommodation system may include examples where the first divider partition and the second divider partition are substantially transparent.

According to certain examples, an aircraft, includes a fuselage, which is defined as a passenger seating deck having a floor and a ceiling provided. The fuselage may have a longitudinal axis extending in the direction of travel of the aircraft and a lateral axis extending transverse to the longitudinal axis. The aircraft also includes a plurality of passenger seats disposed within the passenger seating deck. The aircraft also includes an overhead storage system, including a plurality of storage bins. The overhead storage system is fixedly mounted to the ceiling above the plurality of passenger seats. The aircraft also includes a seat partitioning system, including a plurality of divider partitions removably connected to the overhead storage system. At least a portion of the plurality of divider partitions are configured to selectively isolate groups of passenger seats of the plurality of passenger seats along the longitudinal axis and the lateral axis.

In some examples, a first divider partition of the plurality of divider partitions may be substantially aligned with the longitudinal axis and formed from a flexible material, and a second divider partition of the plurality of divider partitions may be substantially aligned with the lateral axis and formed from a rigid material. In some examples, substantially all of the plurality of divider partitions may be formed from a flexible material. In some examples, the groups of passenger seats may include two or more rows of passenger seats. In some examples, the portion of the divider partitions that are configured to selectively isolate the groups of passenger seats may include curtains that are removably connected to the overhead storage system via a set of curtain tracks. In some examples, the seat partitioning system may be configured to form a plurality of physical barriers between the groups of passenger seats.

According to certain examples, a seat partitioning system for use within an aircraft is provided. The seat partitioning system includes a plurality of divider partitions, including a first set of divider partitions and a second set of divider partitions, a mounting mechanism, including a plurality of mounting tracks configured to: connect to an overhead portion of the aircraft, removably retain the first set of divider partitions of the plurality of divider partitions in a longitudinal orientation and in a hanging configuration, and removably retain a second set of divider partitions of the plurality of divider partitions in a lateral orientation and in the hanging configuration. The seat partitioning system also includes where, when the seat partitioning system is deployed in the aircraft, at least some divider partitions of the plurality of divider partitions are configured to selectively isolate groups of passenger seats within the aircraft along a longitudinal axis and a lateral axis.

In some examples, the first set of divider partitions may be formed from a flexible material and the second set of divider partitions formed from a rigid material. In some examples, the overhead portion of the aircraft may include at least one of a ceiling of the aircraft or an overhead storage system of the aircraft. In some examples, the plurality of divider partitions, when deployed, may provide unobstructed access to the overhead storage system. In some examples, the plurality of divider partitions, when deployed, may create respiratory droplet barriers.

DETAILED DESCRIPTION

Figure 1:
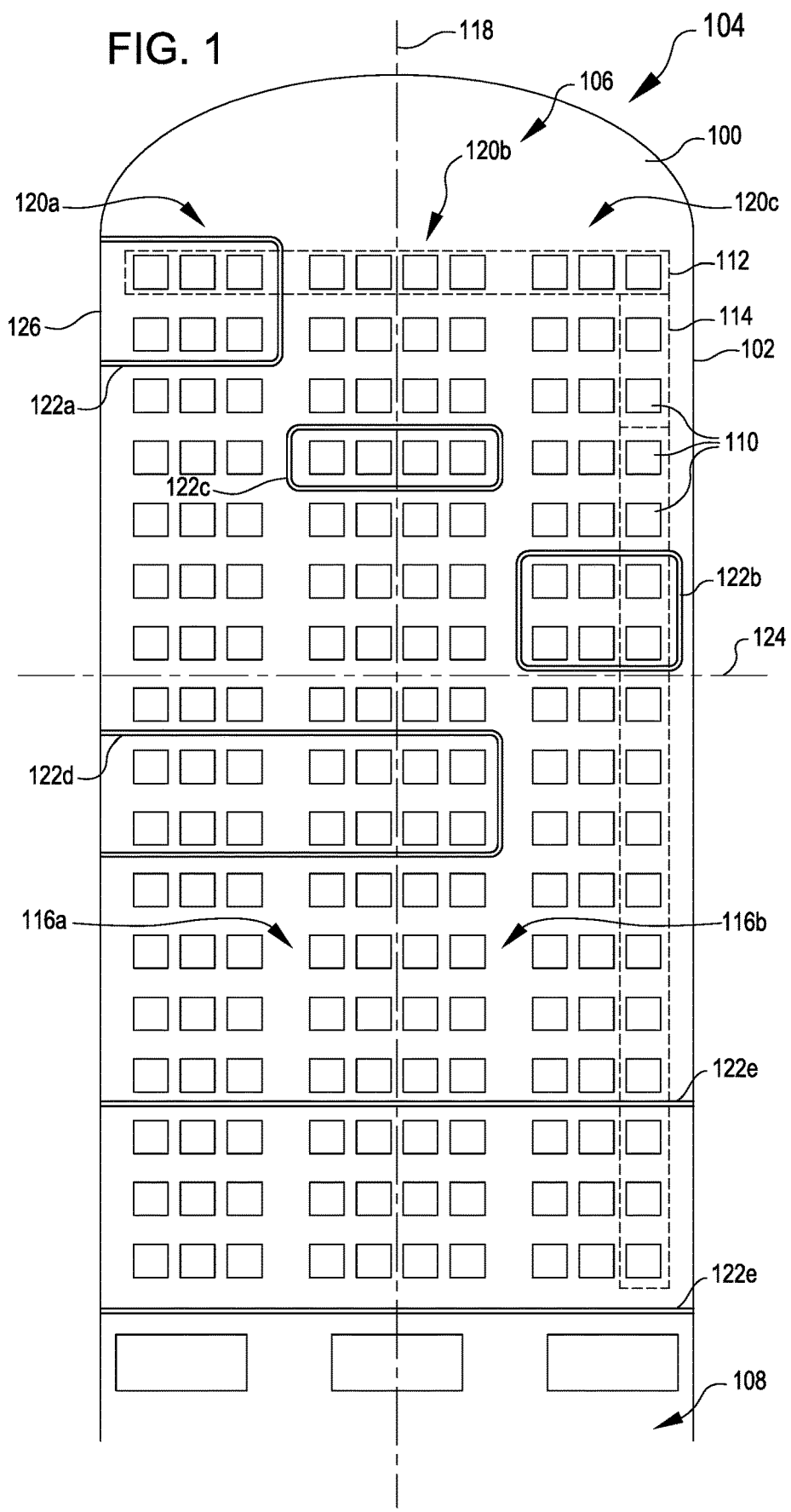
FIG. 1 shows a plan view of an example passenger seating deck of a fuselage of an aircraft, according to at least one example.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described examples of the disclosure provide various seat partitioning systems for segmenting or otherwise dividing up passenger seats within a passenger seating deck of an aircraft. While the seat partitioning systems are discussed for use with aircraft seats, they are by no means so limited. Rather, examples of the seat partitioning systems may be used in passenger seats or other seats of any type or otherwise as desired.

Passengers who travel on commercial airlines, especially those in economy seating, are accustomed to sitting in close proximity to other passengers. For example, a passenger in a middle seat on a row of three seats may have passengers sitting to her left and right in rows directly forward and directly aft. In some cases, however, passengers may not be comfortable sitting in such close proximity. This may be especially true during times when rates of bacteria and virus transmission are high, such as during the Coronavirus pandemic of 2020. To minimize rates of transmission and generally alleviate passenger concerns, it may be desirable to divide seats of a passenger seating deck with physical barriers, such as the seat partitioning systems described herein. These physical barriers can function to keep passengers from touching each other, thereby minimizing transmission of virus via physical touch. For example, a physical barrier may be placed between two seats in a row to keep passengers from inadvertently touching each other and/or each other's seats. These physical barriers can also function to keep respiratory droplets of certain passengers (e.g., those thought to be sick) within a predefined area, thereby minimizing transmission of virus via the air. Example partitioning systems described herein may be deployed in existing aircraft with limited cost of impact on existing procedures.

In a particular example, a seat partitioning system includes a set of curtain tracks and a set of curtains connected to the tracks. The curtain tracks are mounted above a set of passenger seats on a passenger seating deck of an aircraft. For example, the curtain tracks may be mounted to the ceiling or to the underside of overhead storage bins. The curtains extend from curtain racks to the floor of the passenger seating deck. Some curtain tracks are mounted in a general longitudinal orientation that is aligned with the direction of travel of the aircraft. Some curtain tracks are mounted in a general lateral orientation. This combination of longitudinally-oriented and laterally-oriented curtain tracks enables the curtains to entirely close off a passenger seating subarea. For example, a set of passenger seats may be enclosed on four sides by one or more curtains. The curtains may be formed from a clear and flexible material and may be configured for quick removal and replacement (e.g., between flights).

Turning now to the figures, FIG. 1 illustrates a plan view of an example passenger seating deck 100 of a fuselage 102 of a passenger aircraft 104, according to at least one example. Seat partitioning systems may be implemented to include the elements of the passenger seating deck 100. The passenger seating deck 100 generally includes at least one passenger seating area 106 and a galley area 108. In the passenger seating area 106 is disposed passenger seats 110, arranged in a series of rows 112 and a series of columns 114, spread across a plurality of passenger seating sections 120a, 120b, and 120c. One or more longitudinal passenger aisles 116a and 116b are shown in the passenger seating area 106, which define the passenger seating section 120. The passenger aisles 116 can be aligned with a longitudinal axis 118, which runs parallel to the direction of travel of the passenger aircraft 104. The passenger aisles 116 allow passengers to move forward and aft in the aircraft and to move between passenger seating sections 120 (e.g., lengthwise and/or widthwise). In wider aircraft, the number of passenger seating sections 120 may range between two and four or more. In smaller aircraft, the number of passenger seating sections 120 may be two or more.

FIG. 1 includes a conceptual representation of different ways that seat partitioning systems 122 may be deployed in the passenger aircraft 104. Generally, the seat partitioning systems 122 described herein may be deployed to partition at least one passenger seat 110, but in most cases, more than one passenger seat 110.

For example, the seat partitioning systems 122 may be deployed at the forward end of the passenger aircraft 104. For example, the seat partitioning system 122a may separate six passenger seats 110, all of which are located in one passenger seat section 120 and divided across two rows 112. The seat partitioning system 122a has a U-shape with a middle aligned generally with the longitudinal axis 118 and two legs aligned generally with a lateral axis 124. The far edges of the of the seat partitioning system 122a may connect with an interior wall 126 of the fuselage 102. In this manner, the area including the six passenger seats 110 is bounded on three sides by the seat partitioning system 122a, and one side by the interior wall 126 of the fuselage 102. In some examples, the area including the passenger seats 110 may be bounded on all four sides by a seat partitioning system, such as the seat partitioning system 122b. This may be desirable to reduce the number of connections between the seat partitioning system 122 and the interior walls 126 of the fuselage 102.

In some examples, seat partitioning systems 122 may be deployed in the middle of the passenger aircraft 104. For example, the seat partitioning system 122c may separate four passenger seats 110, all of which are located in one row 112 within one passenger seating section 120b. In this example, the seat partitioning system 122c may bound the area including the four passenger seats 110 on all four sides, with sections aligned generally with the longitudinal axis 118 and lateral axis 124.

In some examples, seat partitioning systems 122 may be deployed to separate passenger seats 110 across multiple rows 112 and across multiple passenger seating sections 120. For example, the seat partitioning system 122d may separate fourteen passenger seats 110 distributed across two rows 112 and across passenger seating sections 120a and 120b. As described in more detail with respect to FIG. 3, when the seat partitioning systems 122 extend across passenger aisles 116, such as the seat partitioning system 122d, the seat partitioning system 122d may include a set of closable openings to enable movement of persons and things along the aisle 116a.

In some examples, seat partitioning systems 122 may be deployed across the entire width of the passenger seating deck 100 in the fuselage 102. For example, the seat partitioning system 122e may separate multiple rows 112 within each of the three passenger seating sections 120a, 120b, and 120c. In some examples, the seat partitioning system 122e may bound the passenger seats 110 on at least two sides (e.g., forward and aft sides), while using the inside surfaces of the fuselage 102 to bound the other two sides. In some examples, partition sections may also extend longitudinally to connect the forward and aft sections that extend laterally. As with the seat partitioning system 122d, the seat partitioning system 122e may include a set of closeable openings to enable movement of persons and things along the aisles 116a and 116b.

Figure 2:
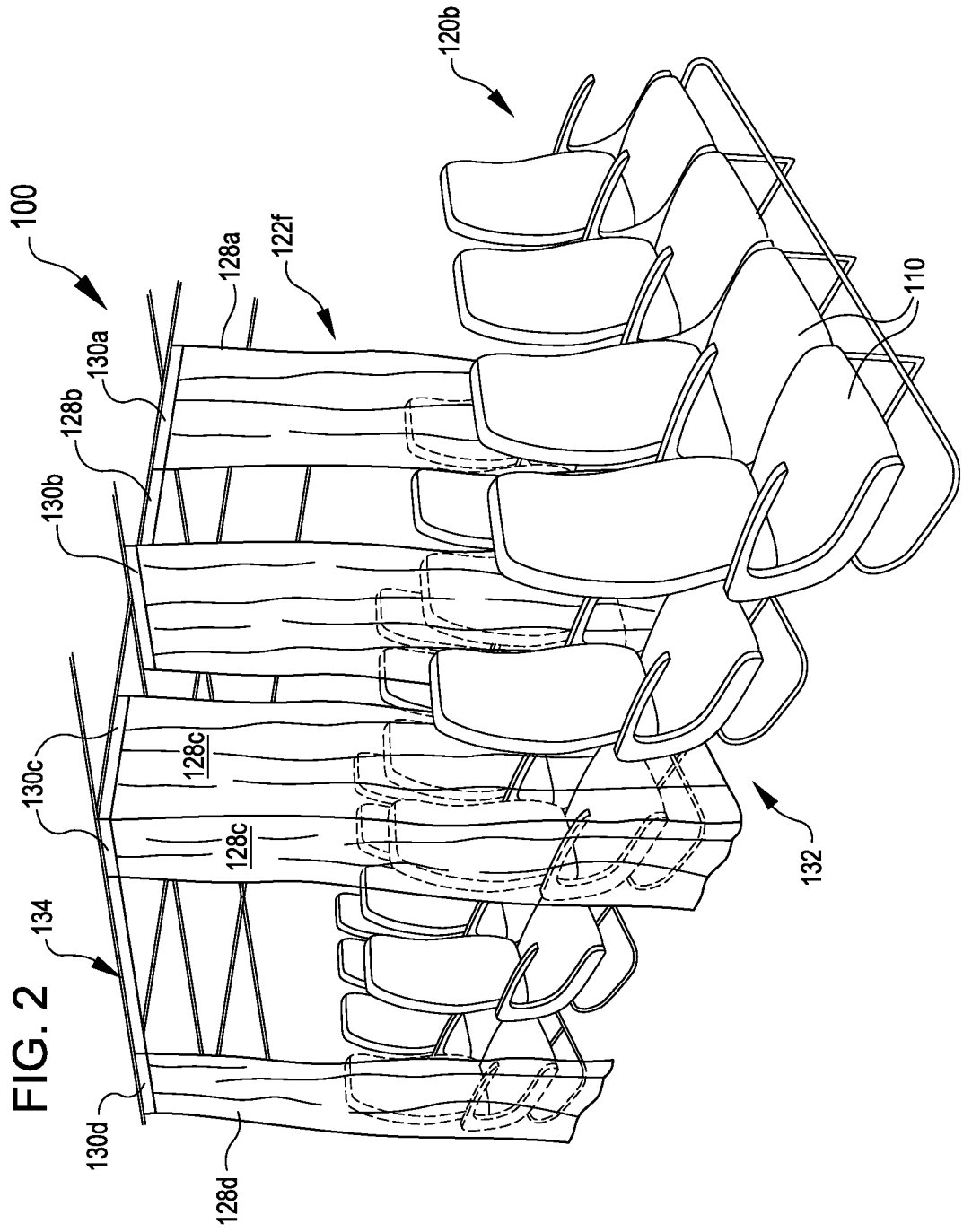
FIG. 2 shows a side perspective view of the passenger seating deck of FIG. 1, according to at least one example.

FIG. 2 shows a side perspective view of the passenger seating deck 100 of FIG. 1, according to at least one example. In FIG. 2, the passenger seating section 120b is illustrated (e.g., a four-wide seat section running in the middle of a wide-body aircraft). The same principles described with respect to the passenger seating section 120b may be applied to other passenger seating sections 120, including those disposed within a narrow-body aircraft (e.g., a six-across configuration or a four-across configuration), each including a single aisle. The passenger seats 110 are attached to a floor 132 of the passenger aircraft 104.

In FIG. 2, the seat partitioning system(s) 122 are defined by a set of dividers, which are formed from a set of flexible curtains 128. The set of flexible curtains 128 are releasably connected to a set of corresponding mounting mechanisms 130. The mounting mechanisms 130 are connected to a ceiling 134 of the passenger seating deck 100. The mounting mechanisms 130 retain top ends of the flexible curtains 128, allowing the curtains to fall towards the floor 132. The length of the flexible curtains 128 is selected such that the flexible curtains 128 extend between the ceiling 134 and the floor 132.

In some examples, the mounting mechanisms 130 may include tracks, buttons, snaps, hook and loop fasteners, and any other connecting means suitable for connecting the flexible curtains 128 to the ceiling 134. In some examples, the mounting mechanism 130 enables sliding movement of the flexible curtains 128 along the lateral and/or longitudinal axes. For example, the flexible curtain 128d has been slid along the longitudinal axis in the aft direction. Likewise, a section of the flexible curtain 128c has been slid along the longitudinal axis in the forward direction. This may be desirable to enable access to the passenger seats 110, bounded by the flexible curtains 128d, 128c, and other curtains not shown in this view.

The flexible curtains 128 may be configured to extend between passenger seats 110, such as the flexible curtain 128b, between rows such as the flexible curtains 128a and 128c, and along aisles such as the flexible curtains 128c and 128d.

The flexible curtains 128 may be formed from plastic, vinyl, rubber, cloth, or other flexible material. In some examples, the flexible curtains 128 may be formed from a transparent, translucent, or similar material that allows at least some light to pass there through. This may be desirable to improve passenger comfort and reduce any stigma associated with traveling within a partitioned zone.

Figure 3:
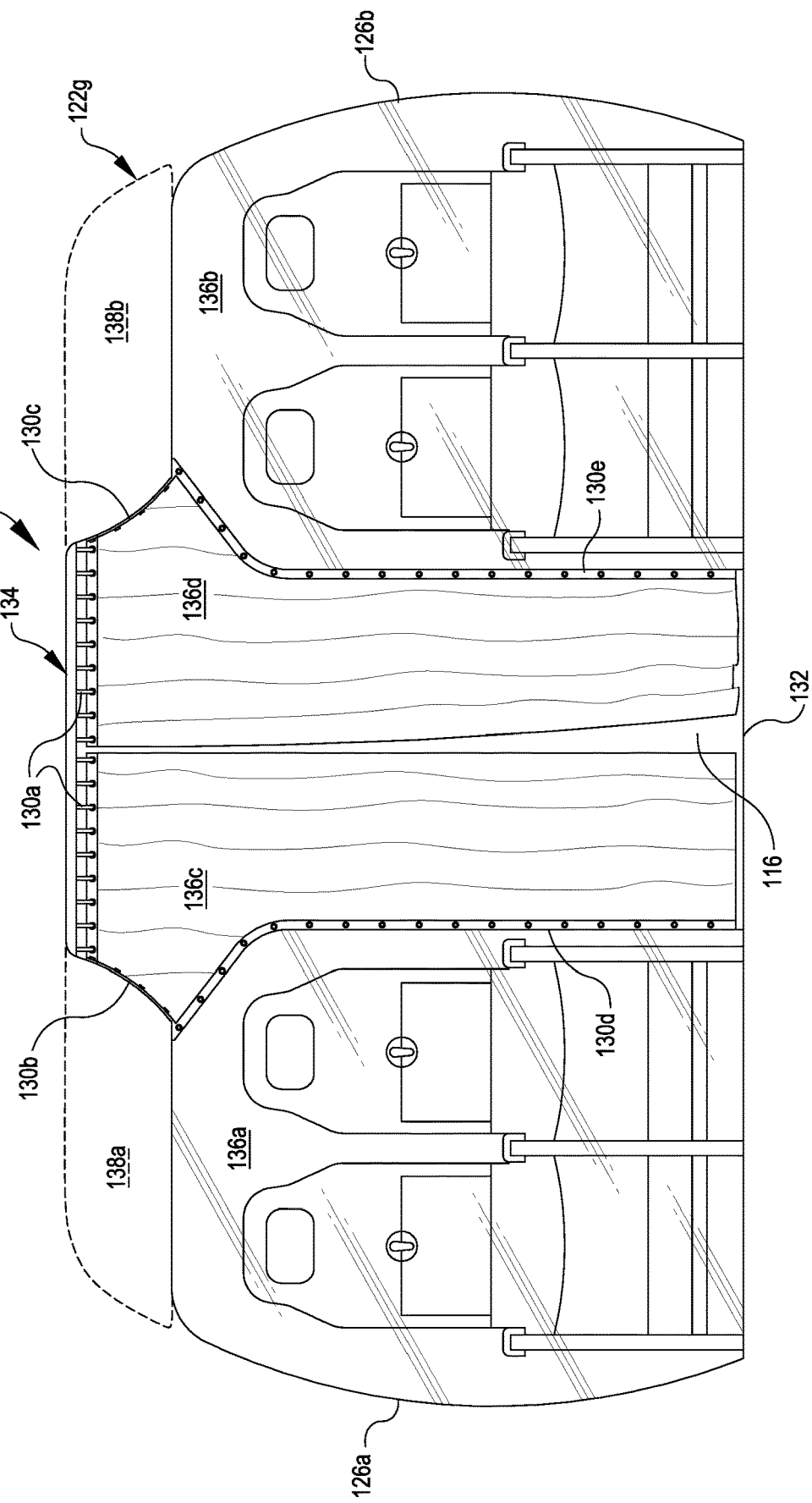
FIG. 3 shows a cross-sectional view of an example row of passenger seats within the passenger seating deck of FIG. 1, according to at least one example.

FIG. 3 shows a cross-sectional view of an example row 112 of passenger seats 110 within the passenger seating deck 100 of FIG. 1, according to at least one example. In FIG. 1, a seat partitioning system 122g is provided that extends laterally across the width of the passenger seating deck 100 (e.g., from interior wall 126a to interior wall 126b) and vertically across the height of the passenger seating deck 100 (e.g., from the ceiling 134 to the floor 132). In some examples, the seat partitioning system 122g may be used to partition an entire section of the passenger aircraft 104 (e.g., when the seat partitioning system 122g is deployed with walls at the aft of the passenger aircraft 104 serving as the rear divider partitions). The seat partitioning system 122g may be employed to separate passengers, while also enabling free movement of people and things along the aisle 116.

The seat partitioning system 1126 includes a plurality of divider partitions 136a-136d. The divider partitions 136a and 136b may be formed from a rigid material such as acrylic, polycarbonate, plexiglass, glass, and other comparable materials. In some examples, the divider partitions 136a and 136b may be transparent. The divider partitions 136a and 136b extend between the floor 132 and an underside of the overhead storage bins 138a and 138b, and laterally from a respective interior walls 126 and a transition area between the aisle 116 and the innermost passenger seat 110. In this manner, the divider partitions 136a and 136b protect passengers from touching and/or droplet contact that may travel longitudinally within the passenger aircraft 104.

The divider partitions 136a and 136b are connected to an underside of the overhead storage bins 138a and 138b. In some examples, the divider partitions 136a and 136b are removably or fixedly connected to each of the floor 132, the interior walls 126a and 126b, and the overhead storage bins 138a and 138b via a mounting mechanism. For example, the divider partitions 136a and 136b may be installed into one or more tracks and include a groove to accept edges of the divider partitions 136a and 136b. The tracks may include a gasket, weather stripping, or other deformable material to provide a tight connection between the tracks and the divider partitions 136a and 136b. In some examples, the mounting mechanism may include brackets that are connected to the divider partitions 136a and 136b and the floor 132, the interior walls 126, and the overhead storage bin 138.

Unlike the rigid divider partitions 136a and 136b, the divider partitions 136c and 136d are formed similar to the flexible curtains discussed with respect to FIG. 2. The divider partitions 136c and 136d are connected at their top ends to the ceiling 134 via mounting mechanisms 130a, upper sides are connected to the overhead storage bins 138 via mounting mechanisms 130b and 130c, and lower sides are connected to the divider partitions 136a and 136b via mounting mechanisms 130d and 130e. In some examples, the mounting mechanism 130a may include a track by which the divider partitions 136c and 136d can be easily retracted. The mounting mechanisms 130b-130e may include snaps, buttons, hook and loop fasteners, and any other comparable mounting mechanism to connect the flexible divider partitions 136c and 136d to the rigid divider partitions 136a and 136b. In some examples, the mounting mechanisms 130b-130e may be disconnected less frequently than the sliding mounting mechanism 130a. For example, the mounting mechanism 130a may be used to open and close the seat partitioning system 122g during a flight, while the mounting mechanisms 130b-130e may be secured during the entire duration of the flight. In some examples, at least some of the divider partitions 136a-136d may be removed after each flight and/or sanitized. For example, the flexible divider partitions 136c and 136d may be removed and replaced with clean flexible divider partitions, while the rigid divider partitions 136a and 136b may be sanitized in place between flights.

Figure 4:
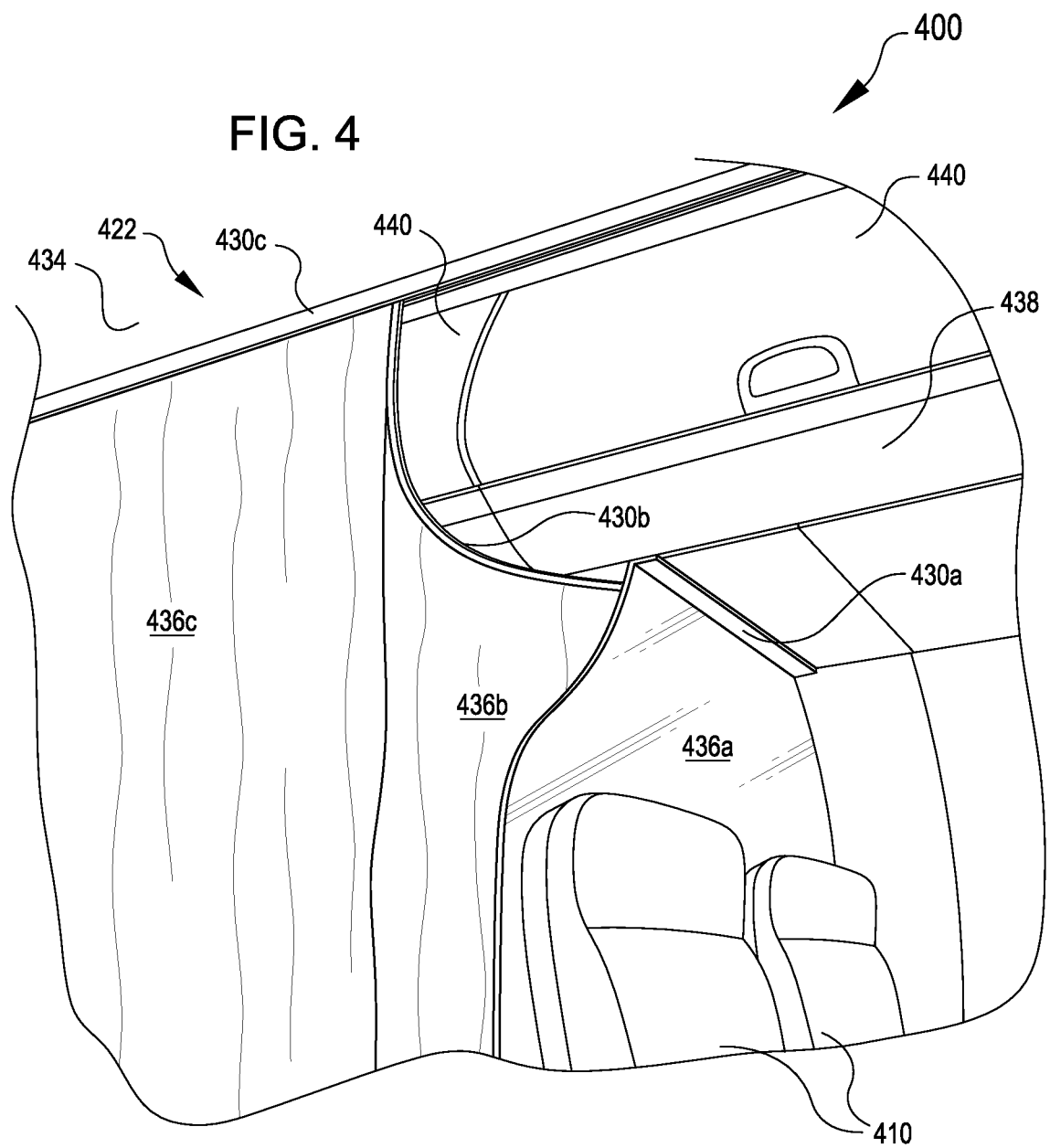
FIG. 4 shows a side perspective view of an example row of passenger seats within the passenger seating deck of FIG. 1, according to at least one example.
Figure 5:
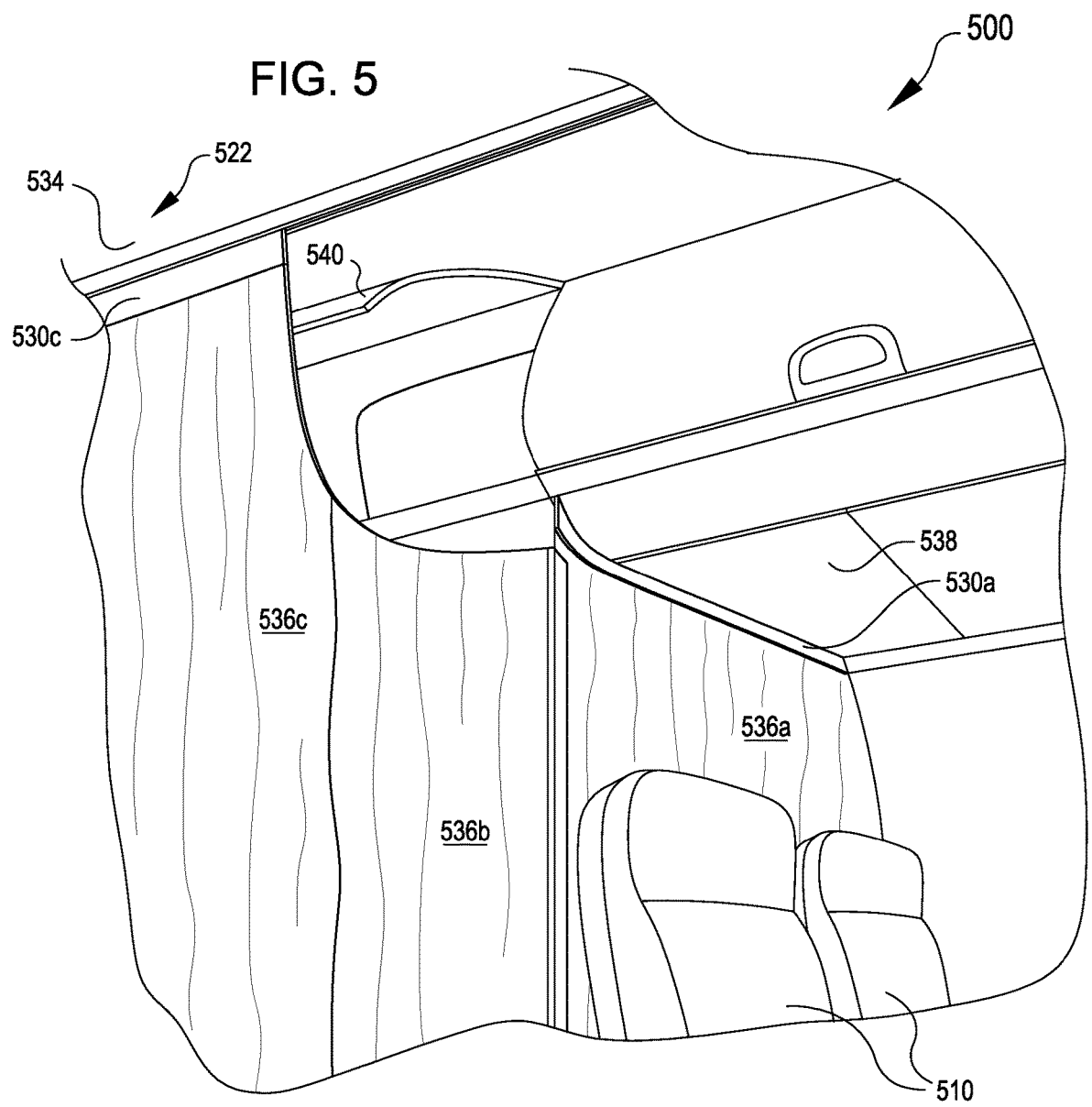
FIG. 5 shows a side perspective view of an example row of passenger seats within the passenger seating deck of FIG. 1, according to at least one example.
Figure 6:
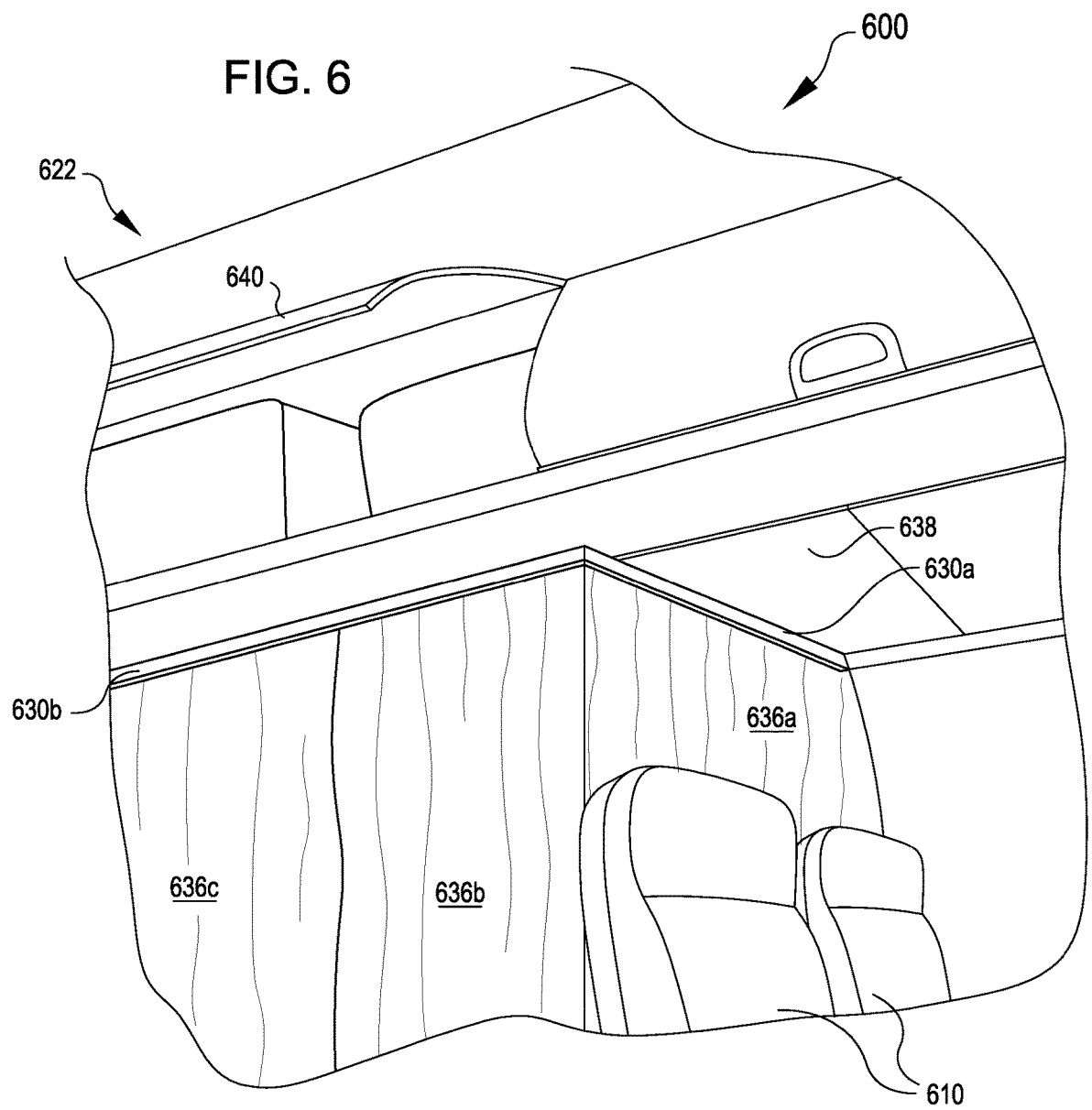
FIG. 6 shows a side perspective view of an example row of passenger seats within the passenger seating deck of FIG. 1, according to at least one example.

FIGS. 4-6 show side perspective views of various rows of passenger seats within the passenger seating deck of FIG. 1, with different variations of seat partitioning systems, according to various examples. Like references numerals in FIGS. 4-6 correspond to like references numerals from FIGS. 1-3. For example, seat partitioning system 422 is an example of the seat partitioning system 122 described herein. The same is true for other reference numerals.

FIG. 4 shows a seat partitioning system 422 disposed within a passenger seating deck 400. The seat partitioning system 422 includes two or more divider partitions 436a-436c. The divider partition 436a may be a rigid divider partition (e.g., the divider partitions 136a and 136b). Thus, the divider partition 436a may be connected to an underside of an overhead storage bin 438 via a mounting mechanism 430a. In some examples, the divider partition 436a may be formed from a flexible material, as described herein.

The divider partitions 436b and 436c, which in some examples may be formed as a single partition, may be respectively connected the underside of the overhead storage bin 438 and a ceiling 434. A mounting mechanism 430b may be connected to the overhead storage bin 438 and have a bent section that extends from the underside of the overhead storage bin 438 to the ceiling 434. In some examples, the bent section may have an arcuate shape that follows the contour of an overhead bin door 440. A mounting mechanism 430c may be connected to the ceiling 434. The mounting mechanisms 430b and 430c may enable the divider partitions 436b and 436c to be opened and closed using a sliding motion and/or removed for cleaning, etc. In some examples, the seat partitioning system 422 may make it difficult for passengers to open the overhead bin doors 440 on the overhead storage bins 438 because the divider partitions 436b and 436c fall directly in front of the overhead bin doors 440. As a benefit, the seat partitioning system 422 may give the passengers within the area defined by the seat partitioning system 422 more space to move around in, as compared to the seat partitioning systems shown in later figures.

FIG. 5 shows a seat partitioning system 522 disposed within a passenger seating deck 500. The seat partitioning system 522 includes two or more divider partitions 536a-536c. The divider partition 536a may be a flexible divider partition (e.g., the divider partitions 136c and 136d) or a rigid divider partition (e.g., the divider partitions 136a and 136b). Thus, the divider partition 536a may be connected to an underside of an overhead storage bin 538 via a mounting mechanism 530a.

The divider partitions 536b and 536c, which in some examples may be formed as a single partition, may be respectively connected an edge of the divider partition 536a and a ceiling 534. Instead of a mounting mechanism like the mounting mechanism 430b, the divider partition 536b may be designed and built in a way that it can curvedly extend around an overhead bin door 540. A mounting mechanism 530c may be connected to the ceiling 534. The mounting mechanism 530c may enable the divider partitions 536b and 536c to be opened and closed using a sliding motion and/or removed for cleaning, etc. In some examples, the seat partitioning system 522 may enable easy access to the overhead storage bins 538 for passengers sitting within the partitioned seats. This is because, unlike the seat partitioning system 422, the seat partitioning system 522 (e.g., the divider partition 536c) is mounted further towards the middle of the aircraft on the ceiling 534, which provides the customers increased area within the partitioned seats.

FIG. 6 shows a seat partitioning system 622 disposed within a passenger seating deck 600. The seat partitioning system 622 includes two or more divider partitions 636a-636c. The divider partition 636a may be a flexible divider partition (e.g., the divider partitions 136c and 136d) or a rigid divider partition (e.g., the divider partitions 136a and 136b). Thus, the divider partition 636a may be connected to an underside of an overhead storage bin 638 via a mounting mechanism 630a.

The divider partitions 636b and 636c, which in some examples may be formed as a single partition, may be mounted to the underside of the overhead storage bin 638 via a mounting mechanism 630b. The mounting mechanism 630c may enable the divider partitions 636b and 636c to be opened and closed using a sliding motion and/or removed for cleaning, etc. The divider partition 636a may also be removably mounted to the mounting mechanism 630a. In some examples, the seat partitioning system 622 may enable easy access to the overhead storage bins 638 for passengers outside of the partitioned seats. This is because, unlike the seat partitioning systems 422 and 522, the seat partitioning system 622 (e.g., the divider partitions 636b and 636c) are mounted on the underside of the overhead storage bin 638.

In the following, further examples are described to facilitate the understanding of the invention:

Example A. A passenger accommodation system, comprising:
   a passenger seating deck disposed within a fuselage of an aircraft, the passenger seating deck defined by a floor and a ceiling, the fuselage having a longitudinal axis extending in the direction of travel of the aircraft and a lateral axis extending transverse to the longitudinal axis;
   a plurality of passenger seats disposed within the passenger seating deck; and
   a seat partitioning system located within the passenger seating deck and comprising a plurality of divider partitions,
   wherein a first divider partition of the plurality of divider partitions is moveably connected to the ceiling, substantially aligned with the longitudinal axis, and formed from a flexible material,
   wherein a second divider partition of the plurality of divider partitions is connected to the ceiling, substantially aligned with the lateral axis, and formed from a rigid material, wherein the second divider partition is moveable with respect to the first divider partition to selectively isolate at least one passenger seat from other adjacent passenger seats of the plurality of passenger seats.

Example B. The passenger accommodation system of any of the preceding or subsequent examples, wherein the plurality of passenger seats are arranged in a set of rows and a set of columns, at least some columns of the set of columns aligned with the longitudinal axis and at least some rows of the set of rows aligned with the lateral axis.

Example C. The passenger accommodation system of any of the preceding or subsequent examples, wherein the first divider partition and the second divider partition are configured to isolate at least one of two or more rows of passenger seats or two or more columns of passenger seats.

Example D. The passenger accommodation system of any of the preceding or subsequent examples, wherein the plurality of divider partitions are removably connected to the ceiling via a connecting mechanism.

Example E. The passenger accommodation system of any of the preceding or subsequent examples, wherein the connecting mechanism comprises curtain tracks, snaps, or hook and loop fasteners.

Example F. The passenger accommodation system of any of the preceding or subsequent examples, further comprising an overhead storage system comprising a plurality of storage bins, the overhead storage system fixedly mounted to the ceiling above the plurality of passenger seats.

Example G. The passenger accommodation system of any of the preceding or subsequent examples, wherein at least the second divider partition is connected to the overhead storage system.

Example H. The passenger accommodation system of any of the preceding or subsequent examples, wherein the plurality of divider partitions are configured to provide unobstructed access to the plurality of storage bins.

Example I. The passenger accommodation system of any of the preceding or subsequent examples, wherein the first divider partition and the second divider partition are substantially transparent.

Example J. An aircraft, comprising:
a fuselage, which is defined as a passenger seating deck having a floor and a ceiling, the fuselage having a longitudinal axis extending in the direction of travel of the aircraft and a lateral axis extending transverse to the longitudinal axis;
a plurality of passenger seats disposed within the passenger seating deck;
an overhead storage system comprising a plurality of storage bins, the overhead storage system fixedly mounted to the ceiling above the plurality of passenger seats; and
a seat partitioning system comprising a plurality of divider partitions removably connected to the overhead storage system, at least a portion of the plurality of divider partitions configured to selectively isolate groups of passenger seats of the plurality of passenger seats along the longitudinal axis and the lateral axis.

Example K. The aircraft of any of the preceding or subsequent examples, wherein a first divider partition of the plurality of divider partitions is substantially aligned with the longitudinal axis and formed from a flexible material, and a second divider partition of the plurality of divider partitions is substantially aligned with the lateral axis and formed from a rigid material.

Example L. The aircraft of any of the preceding or subsequent examples, wherein substantially all of the plurality of divider partitions are formed from a flexible material.

Example M. The aircraft of any of the preceding or subsequent examples, wherein the groups of passenger seats comprises two or more rows of passenger seats.

Example N. The aircraft of any of the preceding or subsequent examples, wherein the portion of the divider partitions that are configured to selectively isolate the groups of passenger seats comprise curtains that are removably connected to the overhead storage system via a set of curtain tracks.

Example O. The aircraft of any of the preceding or subsequent examples, wherein the seat partitioning system is configured to form a plurality of physical barriers between the groups of passenger seats.

Example P. A seat partitioning system for use within an aircraft, comprising:
a plurality of divider partitions comprising a first set of dividers partitions and a second set of divider partitions;
a mounting mechanism comprising a plurality of mounting tracks configured to:
connect to an overhead portion of the aircraft;
removably retain the first set of divider partitions of the plurality of divider partitions in a longitudinal orientation and in a hanging configuration; and
removably retain a second set of divider partitions of the plurality of divider partitions in a lateral orientation and in the hanging configuration,
wherein, when the seat partitioning system is deployed in the aircraft, at least some divider partitions of the plurality of divider partitions are configured to selectively isolate groups of passenger seats within the aircraft along a longitudinal axis and a lateral axis.

Example Q. The seat partitioning system of any of the preceding or subsequent examples, wherein the first set of divider partitions is formed from a flexible material and the second set of divider partitions formed from a rigid material.

Example R. The seat partitioning system of any of the preceding or subsequent examples, wherein the overhead portion of the aircraft comprises at least one of a ceiling of the aircraft or an overhead storage system of the aircraft.

Example S. The seat partitioning system of any of the preceding or subsequent examples, wherein the plurality of divider partitions, when deployed, provide unobstructed access to the overhead storage system.

Example T. The seat partitioning system of any of the preceding or subsequent examples, wherein the plurality of divider partitions, when deployed, create respiratory droplet barriers.

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

The terms "invention," "the invention," "this invention," and "the present invention" used in this patent are intended to refer broadly to all of the subject matter of this patent and the patent claims below. Statements containing these terms should be understood not to limit the subject matter described herein or to limit the meaning or scope of the patent claims below.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

That which is claimed is:

1. A passenger accommodation system, comprising:
a passenger seating deck disposed within a fuselage of an aircraft, the passenger seating deck defined by a floor and a ceiling, the fuselage having a longitudinal axis extending in a direction of travel of the aircraft and a lateral axis extending transverse to the longitudinal axis;
a plurality of passenger seats disposed within the passenger seating deck;
an overhead storage system comprising a plurality of storage bins, the overhead storage system fixedly mounted to the ceiling above the plurality of passenger seats; and
a seat partitioning system located within the passenger seating deck and comprising a plurality of divider partitions,
wherein, in a direction parallel to the longitudinal axis, the plurality of divider partitions comprises a first divider partition of the plurality of divider partitions extending longitudinally,
wherein the first divider partition (i) is connected to the ceiling, (ii) is movable along the longitudinal axis, and (iii) is formed from a flexible material, wherein the first divider partition is connected to the ceiling such that the first divider partition overlaps and covers a surface of an overhead bin door of at least one storage bin of the plurality of storage bins in the direction parallel to the longitudinal axis,
wherein, in a direction parallel to the lateral axis, the plurality of divider partitions includes:
a second divider partition of the plurality of divider partitions extending laterally; and
a third divider partition of the plurality of divider partitions extending laterally,
wherein the second divider partition (i) is formed of a rigid material and (ii) extends from the floor to an underside of an overhead storage bin,
wherein the third divider partition (i) is connected at a top end of the third divider partition to the ceiling, (ii) includes a first side connected to the second divider partition, and is formed from a flexible material,
wherein the first and third divider partitions are moveable with respect to the second divider partition to selectively isolate at least one passenger seat from other adjacent passenger seats of the plurality of passenger seats.

2. The passenger accommodation system of claim 1, wherein the plurality of passenger seats are arranged in a set of rows and a set of columns, at least two columns of the set of columns aligned with the longitudinal axis and at least two rows of the set of rows aligned with the lateral axis.

3. The passenger accommodation system of claim 2, wherein the first divider partition and the second divider partition configured to isolate at least one of two or more rows of passenger seats or two or more columns of passenger seats.

4. The passenger accommodation system of claim 1, wherein the plurality of divider partitions are removably connected to the ceiling via a connecting mechanism.

5. The passenger accommodation system of claim 4, wherein the connecting mechanism comprises curtain tracks, snaps, or hook and loop fasteners.

6. The passenger accommodation system of claim 1, wherein at least the second divider partition is connected to the overhead storage system.

7. The passenger accommodation system of claim 6, wherein the plurality of divider partitions are configured to provide unobstructed access to the plurality of storage bins.

8. The passenger accommodation system of claim 1, wherein the first divider partition and the second divider partition are substantially transparent.

9. An aircraft, comprising:
a fuselage in which is defined a passenger seating deck having a floor and a ceiling, the fuselage having a longitudinal axis extending in a direction of travel of the aircraft and a lateral axis extending transverse to the longitudinal axis;
a plurality of passenger seats disposed within the passenger seating deck;
an overhead storage system comprising a plurality of storage bins, the overhead storage system fixedly mounted to the ceiling above the plurality of passenger seats; and
a seat partitioning system comprising a plurality of divider partitions removably connected to the overhead storage system and removably connected to the ceiling, wherein at least one divider partition of the plurality of divider partitions is connected to the ceiling and movable in a longitudinal direction such that the at least one divider partition of the plurality of divider partitions overlaps and covers a surface of an overhead bin door of at least one storage bin of the plurality of storage bins in a longitudinal direction and selectively isolates groups of passenger seats of the plurality of passenger seats.

10. The aircraft of claim 9, wherein a first divider partition of the plurality of divider partitions is substantially aligned with the longitudinal axis and formed from a flexible material, and a second divider partition of the plurality of divider partitions is substantially aligned with the lateral axis and formed from a rigid material.

11. The aircraft of claim 9, wherein substantially all of the plurality of divider partitions are formed from a flexible material.

12. The aircraft of claim 9, wherein the groups of passenger seats comprises two or more rows of passenger seats.

13. The aircraft of claim 9, wherein the divider partitions that are configured to selectively isolate the groups of passenger seats comprise curtains that are removably connected to the overhead storage system via a set of curtain tracks.

14. The aircraft of claim 9, wherein the seat partitioning system is configured to form a plurality of physical barriers between the groups of passenger seats.

* * * * *